United States Patent [19]
Kiel et al.

[11] Patent Number: 5,761,199
[45] Date of Patent: Jun. 2, 1998

[54] METHOD OF CONTROLLING AN EXCHANGE, ITS CONTROL FACILITIES, PROGRAM MODULES, AND SWITCHING SYSTEM

[75] Inventors: Freidrich Kiel, Leonberg; Karl-Heinz Legat, Renningen, both of Germany

[73] Assignee: Alcatel SEL A.G., Stuttgart, Germany

[21] Appl. No.: 547,307

[22] Filed: Oct. 24, 1995

[30] Foreign Application Priority Data

Oct. 31, 1994 [DE] Germany .................. 44 38 941.8

[51] Int. Cl.⁶ .................. H04L 12/50; H04Q 11/00
[52] U.S. Cl. .................. 370/360; 370/357; 370/352; 379/67
[58] Field of Search .................. 370/352, 395, 370/468, 360, 524, 359, 357; 364/131; 379/280, 67, 70, 102.02, 156; 395/672, 676

[56] References Cited

U.S. PATENT DOCUMENTS 5,471,465  11/1995  Gamm .................. 370/352
5,586,172  12/1996  Sakurai et al. .................. 379/67

FOREIGN PATENT DOCUMENTS 0333123  9/1989  European Pat. Off. .
0578964  1/1994  European Pat. Off. .
2908316  9/1979  Germany .
4104365  3/1992  Germany .

OTHER PUBLICATIONS

"ITT 1240 Digital Exchange Hardware Description", S. Das et al, *Electrical Communication*, vol. 56, No. 2/3, 1981, pp. 135–147.

"ITT 1240 Digital Exchange Architecture", R. Bonami et al, *Electrical Communication*, vol. 56, No. 2/3, 1981, pp. 126–134.

H. Siegert, "Betriebssystems: Eine Einfuhrung", R. Oldenbourg Verlag, Munich, Vienna 1991, pp. 211–212.

"EWSD morgen—zukunftsichere Kommunikation", N. Skaperda, *Telcom Report*, vol. 11, No. 6 (1981), pp. 204–209.

"Private Netze effektiver betreiben", R. Thiele et al, *Telcom Report*, vol. 12, No. 5 (1989), pp. 168–171.

*Primary Examiner*—Wellington Chin
*Assistant Examiner*—Melissa Kay Carman
*Attorney, Agent, or Firm*—Ware, Fressola, Van Der Sluys & Adolphson LLP

[57] ABSTRACT

The control system of an exchange includes two control facilities of different design which cooperate and communicate in executing switching functions. One of the control facilities executes standard switching tasks by means of real-time control programs, and the other executes other switching tasks by means of non-real-time control programs.

15 Claims, 2 Drawing Sheets

METHOD OF CONTROLLING AN EXCHANGE, ITS CONTROL FACILITIES, PROGRAM MODULES, AND SWITCHING SYSTEM

TECHNICAL FIELD

The present invention relates to communications systems and, more particularly, to controlling an exchange, to control facilities, to program modules, as well as an exchange and a switching system.

BACKGROUND OF THE INVENTION

In switching systems, two basic types of control systems have evolved in the course of time: centralized control and distributed control. The invention is based on both types of systems.

A switching system with distributed control is described, for example, in an article by B. Bonami et al, "ITT 1240 Digital Exchange Architecture", *Electrical Communication*, Vol. 56, No. 2/3, 1981, pp. 126–134. There, an exchange consists of a plurality of computer modules and a digital switching network which serves to both set up voice calls between subscribers and establish communication links between the computer modules. The control tasks are distributed to a plurality of like computer modules which cooperate in executing switching functions.

Another exchange with centralized control is described in an article by Nick Skaperda, "EWSD morgen-zukunftssichere Kommunikation", ("EWSD Tomorrow-Communications Safe For The Future") telcom report, Vol. 11, No. 6, 1988. This exchange, too, contains a digital switching network to which the subscribers are connected via digital line units or line/trunk groups which execute part of the control functions. The central control functions are performed by a coordination processor. This is a multiprocessing system which operates in real time and comprises a base processor for Operations and Maintenance (O&M) functions, a variable number of call processors, and a common memory.

The problem with both types of control systems is that the functions to be executed by them are becoming more and more complex since the number of service features required of an exchange is constantly growing. On the one hand, this requires an ever-increasing development expenditure for the completion of new generations of exchanges. On the other hand, the requirement for computing capacity in the exchanges is increasing. In the above-described switching system with centralized base processor for Operations and Maintenance (O&M) functions, a variable number of call processors, multiprocessing system with which the increasing requirement for real-time capacity can be met in a variable manner.

DISCLOSURE OF INVENTION

It is the object of the invention to reduce the complexity of the control of switching systems.

According to a first aspect of the present invention, an exchange is controlled with two different control facilities, wherein a first control facility and a second control facility cooperate in executing switching functions and communicate with one another for this purpose, wherein the first control facility executes standard switching tasks by means of real-time control programs, and that the second control facility executes other switching tasks by means of non-real-time control programs.

According to a second aspect of the present invention, a control facility for an exchange is connected to a further control facility which is different from the control facility and executes standard switching tasks by means of real-time control programs and is designed to execute other switching tasks by means of non-real-time control programs and to cooperate and communicate with the further control facility in executing switching functions.

According to a third aspect of the present invention, a control facility for an exchange is connected to a further control facility which is different from the control facility, wherein the control facility executes switching tasks by means of non-real-time control programs, and wherein the control facility is designed to execute standard switching tasks by means of real-time control programs and to cooperate and communicate with said further control facility in executing switching functions.

According to a fourth aspect of the present invention, a program module for an exchange which is intended for execution in a control facility of the exchange contains a set of control instructions structured to correspond to real-time control programs before execution in the control facility for controlling operation in such a way that the control facility executes other switching tasks and cooperates and communicates with a further control facility in executing switching functions, said further control facility being different from said control facility and executing standard switching tasks by means of real-time control programs.

According to a fifth aspect of the present invention, a program module for an exchange which is intended for execution in a control facility of the exchange contains a set of control instructions structured to correspond to real-time control programs and, when executed in the control facility, controls operation in such a way that the control facility executes standard switching tasks and cooperates and communicates with a further, different control facility in executing switching functions, the further control facility executing other switching tasks by means of non-real-time control programs.

According to a sixth aspect of the present invention, an exchange comprises a switching network and control means, wherein the control means includes a first control facility and a second control facility which is different from the first control facility, wherein the first control facility is designed to execute standard switching tasks by means of real-time control programs, and wherein the second control facility is designed to execute other switching tasks by means of non-real-time control programs and to cooperate and communicate with the first control facility in executing switching functions.

According to a seventh aspect of the present invention, a switching system comprises a plurality of exchanges, each provided with control means, and a switching network, wherein the control means of each exchange includes a first control facility and a second control facility which is different from the first control facility, wherein the first control facility is designed to execute standard switching tasks by means of real-time control programs, wherein the second control facility is designed to execute other switching tasks by means of non-real-time control programs and to cooperate and communicate with the first control facility in executing switching functions, and wherein at least one of the second control facilities is designed to execute higher-level functions for several exchanges.

The invention is predicated on recognition that the cost of developing and testing real-time control programs is considerably higher than that for non-real-time control programs.

The basic idea of the invention is that two control facilities cooperate in executing switching functions, one of them executing standard switching tasks by means of real-time control programs and the other executing other switching tasks by means of non-real-time control programs. Thus, differently adapted control-program implementations are used for different types of tasks. This idea is applicable to both types of control systems mentioned at the beginning.

The invention has the advantage that the complexity of the control programs is reduced, since control-program implementations adapted to the types of tasks are used. This reduces both the cost of testing and development and the complexity involved in meeting computing-capacity requirements.

Another advantage of the invention is that a separation of standard switching tasks and service features is achieved. This makes it possible to separate the development cycles for these two areas, which is advantageous in that the development cycles for standard switching tasks are longer than those for service features.

A further advantage of the invention is that a central interface can be defined between the two control facilities, thus providing open-system capability.

These and other objects, features and advantages of the present invention will become more apparent in light of the detailed description of a best mode embodiment thereof, as illustrated in the accompanying drawing.

BEST MODE FOR CARRYING OUT THE INVENTION

The method according to the invention will be described as used in an exchange according to the invention which forms part of a switching system according to the invention and comprises control facilities according to the invention that are controlled by program modules according to the invention.

Figure 1:
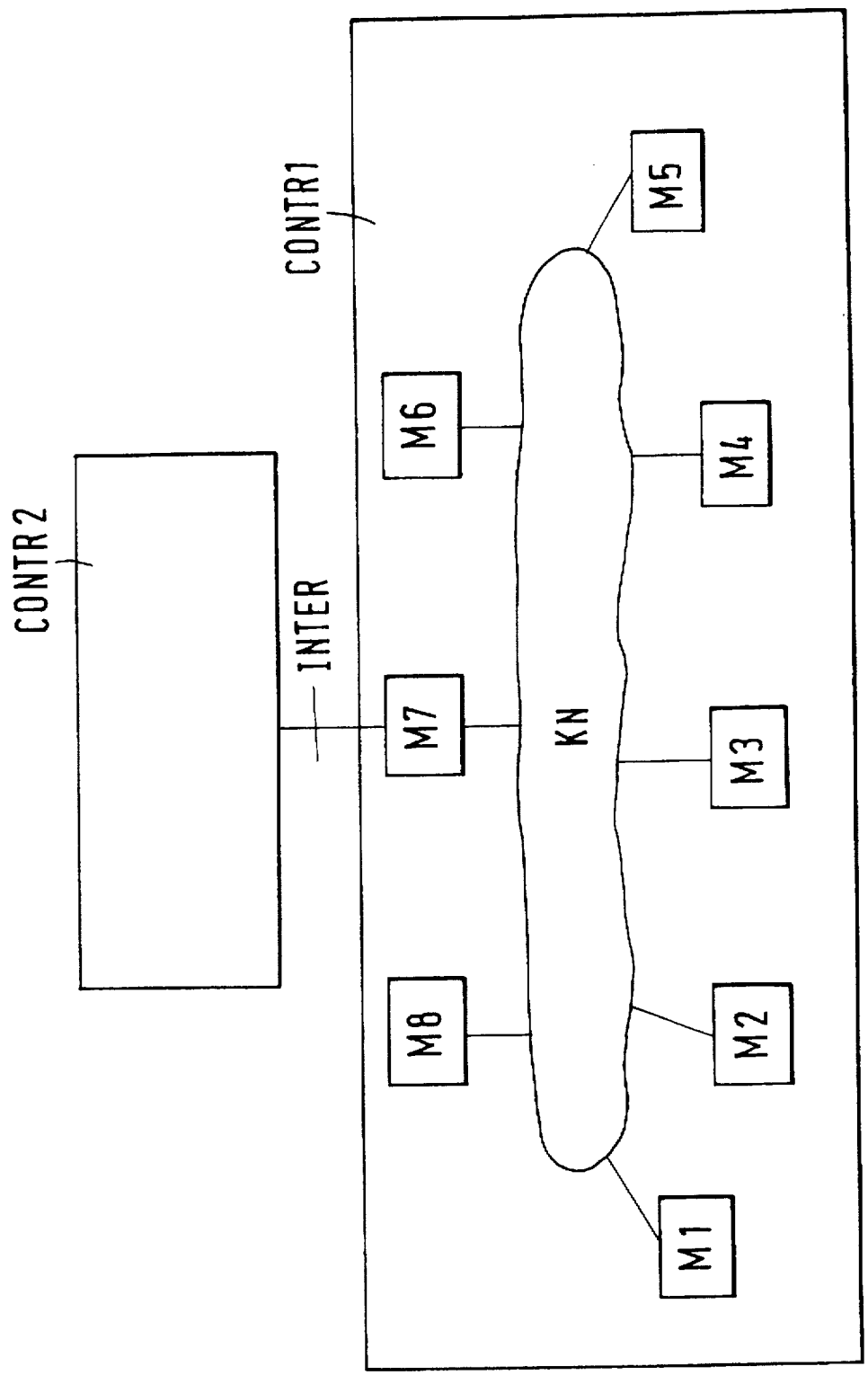
FIG. 1 is a block diagram of a control system for an exchange according to the invention.

FIG. 1 shows a control system of the switching system according to the invention. The control system includes first and second control facilities CONTR1 and CONTR2 respectively, which communicate with one another.

The first control facility CONTR1 executes standard switching tasks or basic switching tasks in real time. It comprises eight computer modules M1 to M8, which exchange data via a communication network KN. The computer module M7 communicates with the second control facility CONTR2.

Each of the computer modules M1 to M8 may include a computer and peripheral components which permit, inter alia, data communication with the other computer modules via the communication network KN. The computer module M7 may include further peripheral components which permit data communication with the control facility CONTR2. The computer modules M1 to M8 are each controlled by one or more real-time control programs and execute, singly or together, basic switching tasks in real time. The design of the computer modules M1 to M8 is apparent, for example, from an article entitled "ITT 1240 Digital Exchange Hardware Description", S. Das et al, *Electrical Communication*, Vol. 56, No. 2/3, 1981, pages 135–147, or from other articles of this volume.

The difference between a real-time implementation and a non-real-time implementation of a control program is familiar to those skilled in the art; see, for example, Chapter 12.8, "Echtzeitsysteme" ("Real-Time Systems"), in a book entitled "Betriebssysteme: Eine Einführung", ("Operating Systems: An Introduction") from the series "Handbuch der Informatik" ("Informatics Handbook") by H.-J. Siegert, published by R. Oldenburg Verlag München/Wien 1991. This difference lies mainly in the types of operating systems and control programs used. For example, the use of programming concepts based on representation by means of so-called state machines is a clear sign of a real-time implementation of a control program.

The communication network KN is the digital switching network which is used in an exchange to establish connections between subscribers. It is also possible, however, to use a dedicated communication network for data communication between the computer modules M1 to M8.

The number of eight computer modules M1 to M8 has been chosen here only by way of example. Also, the control facility CONTR1, instead of comprising a plurality of distributed computer modules, may be formed by a high-capacity host computer which performs the tasks of the computer modules M1 to M8. This computer would then execute these tasks by means of real-time control programs, too.

The control facility CONTR2 may be formed by a host computer with peripheral components which permit, inter alia, data communication with the computer module M7 and the connection of devices for man-machine communication. The control facility CONTR2 executes other switching tasks by means of non-real-time control programs.

The control facility CONTR2 may also be formed by two or more computers which are interconnected via a communication network and which cooperate in processing the tasks of the control facility CONTR2.

The two control facilities CONTR1 and CONTR2 cooperate in executing switching functions. The control facility CONTR1 executes the switching tasks in real time, resorting, if necessary, to services of the control facility CONTR2. The control facility CONTR2 performs more complex switching tasks, such as the implementation of service features, exercising control over the computer modules M1 to M8.

The division of different switching tasks between the control facilities CONTR1 and CONTR2 and their execution will now be described in greater detail with reference to FIG. 2, which shows the architecture of a switching system according to the invention.

Figure 2:
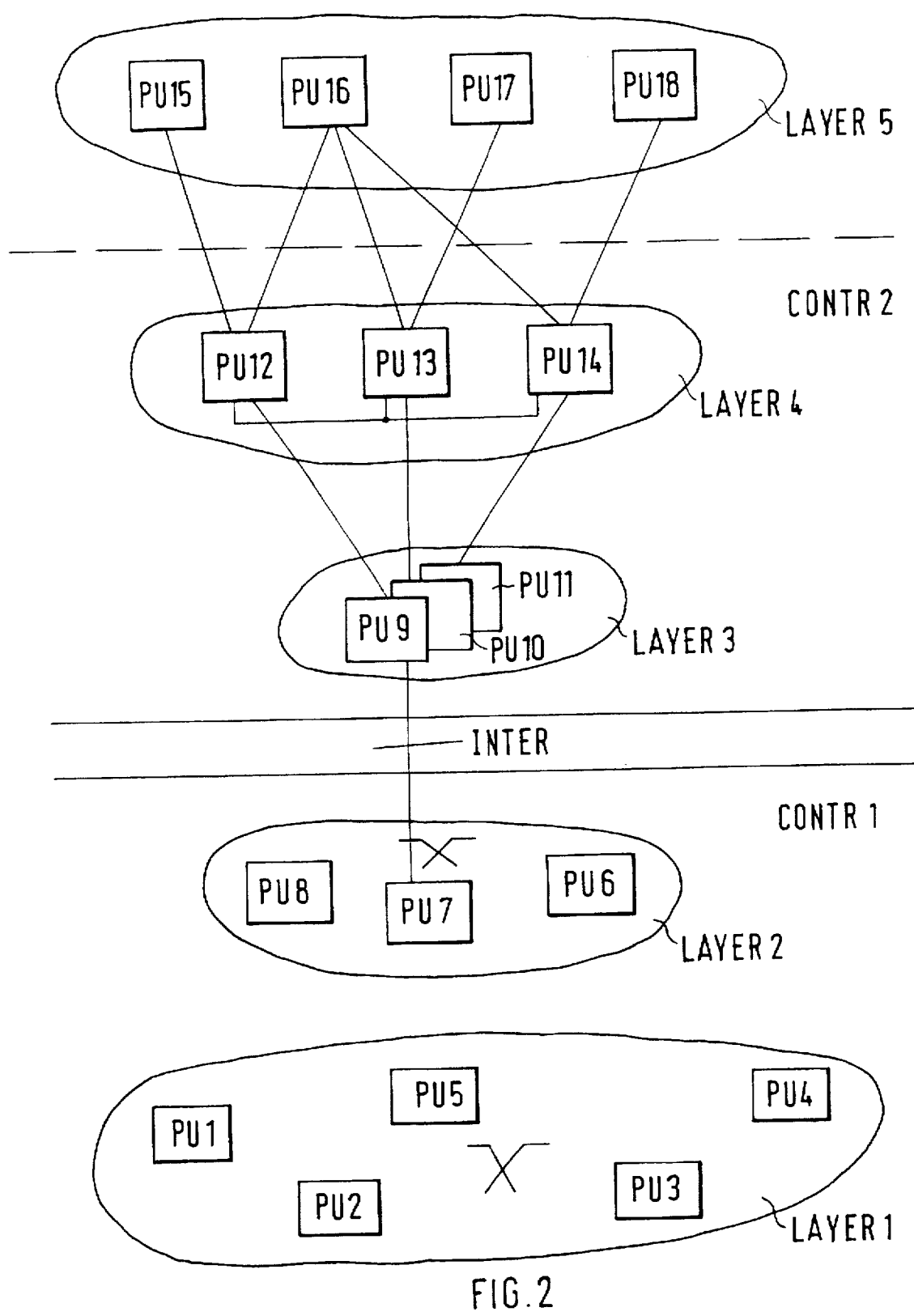
FIG. 2 is a symbolic representation of the architecture of a switching system according to the invention, including the exchange of FIG. 1.

FIG. 2 shows five control layers LAYER1 to LAYER5.

The control layers LAYER1 to LAYER5 comprise 18 processing units PU1 to PU18. Each of these processing units PU1 to PU18 executes a given task, thus representing either a computer module or a process which is executed by a computer.

The control layers LAYER1 and LAYER2 are located in the control facility CONTR1, and the control layers LAYER3 and LAYER4 in the control facility CONTR2. The control layer LAYER5 is located in one or more computer systems remote from the exchange. Such computer systems may also provide functions for several exchanges. It is also possible to dispense with the control layer LAYER5 or to move the control layer LAYER5 to the control facility CONTR2.

The control layer LAYER1 contains the processing units PU1 to PU5; the control layer LAYER2 contains the processing units PU6 to PU8; the control layer LAYER3 contains the processing units PU9 to PU11; the control layer LAYER4 contains the processing units PU12 to PU14; and the control layer LAYER5 contains the processing units PU15 to PU18. The processing units PU1 to PU8 of the control layers LAYER1 and LAYER2 are interconnected via the digital switching network. The processing unit PU7 is connected to the processing units PU9 to PU11 via the interface INTER. The processing units PU9 to PU11 of the control layer LAYER3 are connected to the processing units PU12 to PU14, respectively, of the control layer LAYER4. The processing units PU12 to PU14 of the control layer LAYER4 are connected with one another, and the processing unit PU12 is connected to the processing units PU15 and PU16 of the control layer LAYER5, the processing unit PU13 to the processing units PU16 and PU17, and the processing unit PU14 to the processing units PU16 and PU18.

The processing units PU1 to PU5 of the control layer LAYER1 are formed by the computer modules M1 to M5. These execute decentralized functions, such as transport and routing functions, in real time. This means that two or more of the processing units PU1 to PU5 execute the same task simultaneously.

The processing units PU6 to PU8 of the control layer LAYER2 are formed by the computer modules M6 to M8. They execute partly centralized tasks, such as tasks relating to call set-up or to data collection. To execute these tasks, they are activated by the processing units PU1 to PU5 of the control layer LAYER1 and, in turn, access these processing units to control them. There may or may not exist a permanent assignment of a group of processing units of the control layer LAYER1 to a processing unit of the control layer LAYER2 (centralized control or decentralized control, respectively).

Via the processing unit PU7 and the interface INTER, the processing units of the control layer LAYER2 can communicate with the processing unit PU9 to PU11 of the control layer LAYER3. It is also possible to design two or more processing units like the processing unit PU7, so that the processing units of the control layer LAYER2 can communicate with the processing units of the control layer LAYER3 via two or more paths which lead via the interface INTER.

The processing units PU9 to PU11 of the control layer LAYER3 represent processes which are executed by the computer on which the control facility CONTR2 is based. They receive requests both from the control layer LAYER2, where tasks are executed in real time, and from the control layer LAYER4, where tasks are not executed in real time. The processing units PU9 to PU11 process these requests centrally and coordinate them. Furthermore, they provide the processing units of the control layer LAYER 2 and the control layer LAYER4 with services which enable these units to communicate with one another. This communication is carried out by means of download/upload mechanisms, for example. In addition, the processing units PU9 to PU11 access the processing units of the control layer LAYER2 by control instructions or pass tasks or messages on to the processing units of the control layer LAYER4. The control layer LAYER3 thus represents the interface proper between the execution of tasks in real time, as is carried out by the control layers LAYER1 and LAYER2, and the execution of tasks not in real time, as is carried out by the control layers LAYER4 and LAYER5.

The processing units PU12 to PU14 of the control layer LAYER4 also represent processes which are executed by the computer on which the control facility CONTR2 is based. These processes execute the tasks according to non-real-time control programs and are started by the processing units of the control layer LAYER3 or the control layer LAYER5. The processing units PU12 to PU14 of the control layer LAYER4 execute more complex switching tasks, services, and O&M tasks. Such tasks relate, for example, to ISDN service features, subscriber service features, centrex services, individual call registration, mobile-radio services and applications, or intelligent networks.

The control layer LAYER4 may be divided into two or more sublayers. Processing units of a higher-level sublayer may provide services to one or more processing units of a lower-level sublayer, for example, and processing units of a lower-level sublayer could assign partial tasks to such processing units of a higher-level sublayer for processing.

Furthermore, processing units of the control layer LAYER4 may assign partial tasks to processing units of the control layer LAYER5. These processing units of the control layer LAYER5 may also be available for several processing units of the control layer LAYER4 of the same exchange or of different exchanges.

It is advantageous to perform the following functions by means of processing units of the control layer LAYER4:

Error-management functions, such as providing an error monitor for the exchange, fault location, alarm correlation, or mapping alarms onto object models.

Preprocessing and postprocessing of data on which no exacting time requirements are imposed. Such data are, for example, measured data, call charge data, subscriber data, or data about communication paths.

Providing a Q3 adapter for connection to a network management center.

Providing and preparing statistics data.

Functions for graphically representing the status of the exchange.

It is also advantageous to perform network-management-related switching functions or parts thereof by means of processing units of the control layer LAYER4 provided that these functions relate only to local data and mechanisms of the exchange. Such functions are, for example, pathfinding management, number analysis management, charging and tariffing management, subscriber-access management or traffic flow management functions or management functions of the general signalling system. It is also possible to perform network-management-related functions, such as functions relating to subscriber management, transmission network management, or system security, by means of processing units of the control layer LAYER4.

The processing units PU15 to PU18 of the control layer LAYER5 provide management functions for the operation of the exchange and for the services offered by the exchange. They thus execute tasks of the service and network management. To this end, they communicate with processing units of the control layer LAYER4, from which they request data or to which they transfer control instructions. The processing units PU15 to PU18 thus perform functions which are commonly located at a network management center. Hence, one or more of the processing units PU15 to PU18 of the control layer LAYER5 can cooperate with several or all exchanges of the switching system.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of controlling an exchange having two different control facilities (CONTR1, CONTR2), wherein a first control facility (CONTR1) and a second control facility (CONTR2), cooperate in executing switching functions and communicate with each other for this purpose, the first control facility (CONTR1) executes basic switching tasks including call set up, routing and transport by means of real-time control programs and the second control facility (CONTR2) executes switching tasks more complex than said basic switching tasks by means of non-real-time control programs.

2. A method of controlling an exchange having two different control facilities (CONTR1, CONTR2), wherein a first control facility (CONTR1) and a second control facility (CONTR2), cooperate in executing switching functions and communicate with each other for this purpose, the first control facility (CONTR1) executes basic switching tasks including call set up, routing and transport, by means of real-time control programs and the second control facility (CONTR1) executes switching tasks more complex than said basic switching tasks, by means of non-real-time control programs;

the control facilities (CONTR1, CONTR2) are formed by a plurality of processing units hierarchically arranged in a plurality of layers, and the processing units of different layers handle different types of tasks.

3. A method as claimed in claim 1, characterized in that the first and second control facilities (CONTR1, CONTR2) communicate with one another via a central logic interface (INTER).

4. A method as claimed in claim 2, characterized in that both the layers (LAYER1, LAYER2) of the first control facility (CONTR1) and the layers (LAYER3 to LAYER5) of the second control facility (CONTR1) centralize the tasks toward the central logic interface (INTER) and decentralize the tasks away from the central logic interface (INTER).

5. A method as claimed in claim 2, characterized in that processing units (PU9 to PU14) are formed by logic processes which are executed by a computer.

6. A method as claimed in claim 2, characterized in that processing units (PU1 to PU8) are formed by computer modules (M1 to M8).

7. An exchange having a first control facility and a second control facility wherein said first control facility executes basic switching tasks including call set up, routing and transport, by means of real-time control programs, and said second control facility executes other, more complex, switching tasks, by means of non-real-time control programs, and cooperates and communicates with said first control facility in executing switching functions.

8. A program module for an exchange, which executes in a control facility (CONTR2) in the exchange and contains a set of control instructions, characterized in that the set of control instruction is structured so that it corresponds to non-real-time control programs and, when executed in the control facility (CONTR2), controls operations in the control facility (CONTR2) in such a way that the control facility (CONTR2) executes complex switching tasks and cooperates and communicates with a further control facility (CONTR1) in said exchange in executing switching functions, said further control facility (CONTR1) being different from said control facility (CONTR2) and executing basic switching tasks including call set up, routing and transport, by means of real-time control programs.

9. A first control facility (CONTR1) for an exchange, characterized in that said first control facility (CONTR1) is connected to a further control facility (CONTR2) which is different from said control facility (CONTR1), that said further control facility (CONTR1) executes switching tasks by means of non-real-time control programs, and that said first control facility (CONTR1) executes basic switching tasks including call set up, routing and transport, by means of real-time control programs and cooperates and communicates with said further control facility (CONTR2) in executing switching functions.

10. A program module for an exchange which executes in a control facility (CONTR1) of the exchange and contains a set of control instructions, characterized in that the set of control instructions is so structured that it corresponds to real-time control programs and, when executed in the control facility (CONTR1), controls operations in the control facility (CONTR1) in such a way that the control facility (CONTR1) executes basic switching tasks, including call set up, routing and transport, and cooperates and communicates with a further, different control facility (CONTR2) in executing switching functions, said further control facility (CONTR2) executing more complex switching tasks by means of non-real-time control programs.

11. An exchange comprising a switching network and control means, wherein the control means includes a first control facility (CONTR1) and at least one second control facility (CONTR2) which is different from the first control facility (CONTR1), the first control facility (CONTR1) executes basic switching tasks including call set up, routing and transport, by means of real-time control programs, and each second control facility (CONTR2) executes other switching tasks, more complex than said basic switching tasks, by means of non-real-time control programs, and cooperates and communicates with the first control facility (CONTR1) in executing switching functions, and at least one of the second control facilities(CONTR2) executes higher-level functions for several exchanges.

12. An exchange as claimed in claim 11, characterized in that the first control facility (CONTR1) consists of a plurality of computer modules (M1 to M8).

13. An exchange as claimed in claim 11, characterized in that the second control facility (CONTR2) is formed by a host computer designed to execute several logic processes.

14. A switching system comprising a plurality of exchanges, each provided with control means and a switching network, wherein the control means of each exchange includes a first control facility (CONTR1) and a second control facility (CONTR2) which is different from the first control facility (CONTR1), the first control facility (CONTR1) executes basic switching tasks, including call set up, routing and transport, by means of real-time control programs, and wherein the second control facility (CONTR2) executes other switching tasks, more complex than said basic switching tasks, by means of non-real-time control programs, and cooperates and communicates with the first control facility (CONTR1) in executing switching functions.

15. A method as claimed in claim 3, characterized in that both the layers (LAYER1, LAYER2) of the first control facility (CONTR1) and the layers (LAYER3 to LAYER5) of the second control facility (CONTR1) centralize the tasks toward the central logic interface (INTER) and decentralize the tasks away from the central logic interface (INTER).

* * * * *

UNITED STATES PATENT AND TRADEMARK OFFICE
CERTIFICATE OF CORRECTION

PATENT NO. : 5,761,199
DATED : June 2, 1998
INVENTOR(S) : Kiel, et al

It is certified that error appears in the above-identified patent and that said Letters Patent is hereby corrected as shown below:

Column 7, line 18 (line 10 of claim 2) "the second control facility (CONTR1)" should read -- the second control facility (CONTR2)--.

Column 7, line 33 (line 4 of claim 4) "the second control facility (CONTR1)" should read -- the second control facility (CONTR2)--.

Column 8, line 63 (line 4 of claim 15) "the second control facility (CONTR1)" should read -- the second control facility (CONTR2)--.

Signed and Sealed this

Thirtieth Day of March, 1999

Attest:

Attesting Officer

Q. TODD DICKINSON

Acting Commissioner of Patents and Trademarks